United States Patent
Kitade et al.

(10) Patent No.: US 9,920,142 B2
(45) Date of Patent: Mar. 20, 2018

(54) PRODUCTION METHOD OF (METH)ACRYLIC RESIN COMPOSITION

(71) Applicant: KURARAY CO., LTD., Kurashiki-shi (JP)

(72) Inventors: Yasuhito Kitade, Tainai (JP); Hiroshi Ozawa, Tainai (JP); Shouji Tanaka, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/116,676

(22) PCT Filed: Feb. 6, 2015

(86) PCT No.: PCT/JP2015/053341
§ 371 (c)(1),
(2) Date: Aug. 4, 2016

(87) PCT Pub. No.: WO2015/119233
PCT Pub. Date: Aug. 13, 2015

(65) Prior Publication Data
US 2016/0347879 A1   Dec. 1, 2016

(30) Foreign Application Priority Data
Feb. 6, 2014   (JP) .................. 2014-021667

(51) Int. Cl.
*C08F 20/68* (2006.01)
*C08F 2/02* (2006.01)
*C08F 220/14* (2006.01)
*C08F 220/18* (2006.01)
*C08F 20/14* (2006.01)
*C08F 120/14* (2006.01)
*C08L 33/06* (2006.01)

(52) U.S. Cl.
CPC ............... *C08F 20/68* (2013.01); *C08F 2/02* (2013.01); *C08F 20/14* (2013.01); *C08F 120/14* (2013.01); *C08F 220/14* (2013.01); *C08F 220/18* (2013.01); *C08L 33/06* (2013.01)

(58) Field of Classification Search
CPC ........................................................ C08F 20/68
USPC .......................................................... 526/219
See application file for complete search history.

(56) References Cited

U.S. PATENT DOCUMENTS

| | | | |
|---|---|---|---|
| 6,241,928 B1 | 6/2001 | Hatsuda et al. | |
| 2007/0299226 A1 | 12/2007 | Park et al. | |
| 2013/0041117 A1 | 2/2013 | Hayashida et al. | |

FOREIGN PATENT DOCUMENTS

| | | | |
|---|---|---|---|
| GB | 2 284 425 A | 6/1995 | |
| JP | 2000-136203 A | 5/2000 | |
| JP | 2001-131210 A | 5/2001 | |
| JP | 2008-519137 A | 6/2008 | |
| JP | 2009-256493 A | 11/2009 | |
| JP | 2010-229318 A | 10/2010 | |
| JP | 2013-194177 A | 9/2013 | |
| WO | WO 2011/125980 A1 | 10/2011 | |
| WO | WO 2014/002503 A1 | 1/2014 | |
| WO | WO 2014/007271 A1 | 1/2014 | |

OTHER PUBLICATIONS

Supplementary European Search Report dated Aug. 25, 2017 in Patent Application No. 15745810.0.
International Search Report dated Apr. 7, 2015 in PCT/JP2015/053341.

*Primary Examiner* — Terressa Boykin
(74) *Attorney, Agent, or Firm* — Oblon, McClelland, Maier & Neustadt, L.L.P.

(57) ABSTRACT

A (meth)acrylic resin composition is obtained by a method that comprises: preparing a liquid starting material (A) comprising methyl methacrylate, an acrylic acid alkyl ester and a chain transfer agent, having a mass ratio of the acrylic acid alkyl ester to the methyl methacrylate of 0/100 to 20/80, and having a dissolved oxygen concentration of not more than 50 ppm, preparing a liquid starting material (B) comprising a radical polymerization initiator, a polymerization inhibitor and methyl methacrylate, and having been maintained at a temperature of not more than 10° C. in the presence of oxygen, continuously feeding the liquid starting material (A) and the liquid starting material (B) into a tank reactor, allowing bulk polymerization to proceed in the tank reactor at a polymerization conversion ratio of 40 to 70% by mass to give a reaction product, and continuously discharging the reaction product from the tank reactor.

12 Claims, 1 Drawing Sheet

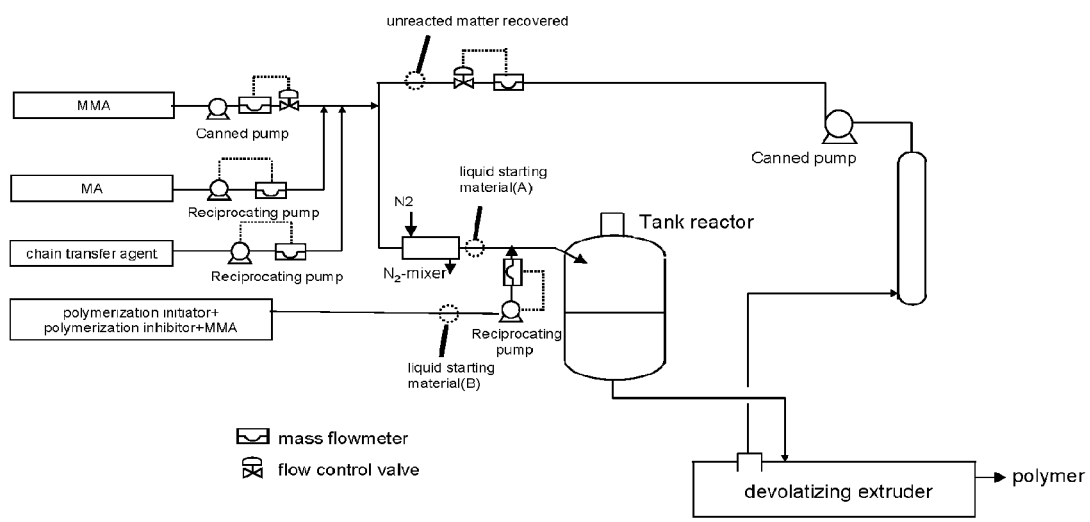

PRODUCTION METHOD OF (METH)ACRYLIC RESIN COMPOSITION

TECHNICAL FIELD

The present invention relates to a method for producing a (meth)acrylic resin composition. More specifically, the present invention relates to a method for producing a (meth)acrylic resin composition, during a temporary halt to operation in the continuous bulk polymerization mode, the method allowing little fluctuation to occur in the polymerization conversion ratio of a reaction solution within a reaction tank and no degradation to proceed in a liquid starting material stagnated in a pipe or the like.

BACKGROUND ART

A formed article comprising (meth)acrylic resin compositions has excellent transparency and low optical distortion, and therefore has found applications as optical lenses, substrates for discs, automobile parts, signboards, name plates, lighting covers, light guide plates and the like.

As one of methods for producing a (meth)acrylic resin composition, known is a method comprising continuously feeding a liquid starting material comprising a polymerizable monomer, a polymerization initiator and the like into a tank reactor for bulk polymerization while continuously discharging a reaction product (hereinafter, the method is sometimes called the continuous bulk polymerization mode). The continuous bulk polymerization mode is suitable for mass production of a (meth)acrylic resin composition having excellent optical properties.

In the continuous bulk polymerization mode, operation is sometimes halted for cleaning or replacing components, for example. When operation is halted, the temperature of the reaction solution within the polymerization tank is lowered for preventing oxidation and degradation of the resin and, when necessary, the entire reaction solution is discharged from the polymerization tank. These processes require additional steps and time until operation resumes, and also end up wasting raw materials and heat, contributing to an increase in production costs. As a prevention measures, Patent Document 1 discloses use of a chain transfer agent in order to enable the reaction solution within the tank reactor to maintain its amount, its temperature, and its polymerization conversion ratio constant during the halted feeding of the polymerizable monomer and the polymerization initiator.

CITATION LIST

Patent Literatures

Patent Document 1: JP 2010-229318 A

Non-Patent Literatures

Non-Patent Document 1: Technical data from Nippon Oil & Fats Co., Ltd. "Hydrogen abstraction capacity and initiator efficiency of organic peroxides" (prepared on April, 2003)

Non-Patent Document 2: Kagaku Kogaku Binran edited by Kagaku Kogaku Kyokai, 3rd revision, p 1068 (1968)

SUMMARY OF THE INVENTION

Problems to be Resolved by the Invention

An object of the present invention is to provide a method for producing a (meth)acrylic resin composition, during a temporary halt to operation in the continuous bulk polymerization mode, the method allowing little fluctuation to occur in the polymerization conversion ratio of a reaction solution within a reaction tank and no degradation to proceed in a liquid starting material stagnated in a pipe or the like.

Means for Solving the Problems

Although the method described in Patent Document 1 is an excellent method, earnest studies from a different perspective result in completing the present invention including the following embodiments.

[1] A method for producing a (meth)acrylic resin composition, the method comprising: preparing a liquid starting material (A) which comprises methyl methacrylate, an acrylic acid alkyl ester and a chain transfer agent, has a mass ratio of the acrylic acid alkyl ester to the methyl methacrylate of 0/100 to 20/80, and has a dissolved oxygen concentration of not more than 50 ppm, preparing a liquid starting material (B) which comprises a radical polymerization initiator, a polymerization inhibitor and methyl methacrylate, and has been maintained at a temperature of not more than 10° C. in the presence of oxygen, continuously feeding the liquid starting material (A) and the liquid starting material (B) into a tank reactor, allowing bulk polymerization to proceed in the tank reactor at a polymerization conversion ratio of 40 to 70% by mass to give a reaction product, and continuously discharging the reaction product from the tank reactor.

[2] The method, as described in [1], for producing a (meth)acrylic resin composition, wherein the liquid starting material (A) has the dissolved oxygen concentration of not more than 1 ppm.

[3] The method, as described in [1] or [2], for producing a (meth)acrylic resin composition, wherein a concentration of the radical polymerization initiator in the liquid starting material (A) is not less than 0.01% by mass and less than 4% by mass.

[4] The method as described in any one of [1] to [3], wherein the dissolved oxygen concentration in the liquid starting material (A) is controlled by a method comprising mixing the liquid starting material (A) and an inert gas so that a ratio of a feeding amount of the liquid starting material (A) [kg/h] to a feeding amount of the inert gas [$Nm^3/h$] is less than 0.30.

[5] The method, as described in any one of [1] to [4], for producing a (meth)acrylic resin composition, further comprising removing unreacted matter from the reaction product.

Advantageous Effects of the Invention

In the method for producing a (meth)acrylic resin composition of the present invention, a liquid starting material comprising a polymerization initiator as well as a reaction solution within a tank reactor can be maintained stable during temporarily halted operation in the continuous bulk polymerization mode for the purpose of repair or inspection, for example, and when the operation resumes, the operation can return to a steady state immediately after it resumes. As a result, the need for making a new liquid starting material comprising a polymerization initiator, lowering the temperature of the reaction solution within the tank reactor, and discharging the reaction solution from the tank reactor is reduced, for instance. Consequently, the present invention can contribute to a significant reduction in production costs.

BRIEF DESCRIPTION OF THE DRAWINGS

FIG. 1 an illustration of an apparatus used to implement the method according to the present invention.

EMBODIMENTS FOR CARRYING OUT THE INVENTION

The method for producing a (meth)acrylic resin composition according to an embodiment of the present invention comprises preparing a liquid starting material (A), preparing a liquid starting material (B), continuously feeding the liquid starting material (A) and the liquid starting material (B) into a tank reactor, allowing bulk polymerization to proceed within the tank reactor to give a reaction product, and continuously discharging the reaction product from the tank reactor.

The liquid starting material (A) comprises methyl methacrylate, an acrylic acid alkyl ester and a chain transfer agent.

As for the methyl methacrylate and the acrylic acid alkyl ester comprised in the liquid starting material (A), the mass ratio of the acrylic acid alkyl ester to the methyl methacrylate is preferably from 0/100 to 20/80, more preferably from 0/100 to 10/90. The total feeding amount of the methy methacrylate and the acrylic acid alkyl ester comprised in the liquid starting material (A) is equal to a difference between the feeding amount, 100 parts by mass, of all the polymerizable monomers subjected to the polymerization and the total feeding amount of an additional polymerizable monomer that can be comprised in the liquid starting material (A) and methyl methacrylate comprised in the liquid starting material (B) as described below.

Examples of the acrylic acid alkyl ester include methyl acrylate, ethyl acrylate, propyl acrylate, butyl acrylate, 2-ethylhexyl acrylate, and the like. The acrylic acid alkyl ester can be used alone or as a combination of two or more of these. Among these, methyl acrylate is preferable.

The liquid starting material (A) can further comprising the additional polymerizable monomer. Examples of the additional polymerizable monomer include vinyl monomers having a single polymerizable alkenyl group per a molecule, for example, methacrylic acid alkyl esters except for methyl methacrylate, such as ethyl methacrylate, propyl methacrylate, butyl methacrylate, 2-ethylhexyl methacrylate or the like; aryl methacrylate esters such as phenyl methacrylate; cycloalkyl methacrylate esters such as cyclohexyl methacrylate, norbornenyl methacrylate or the like; aryl acrylate esters such as phenyl acrylate or the like; cycloalkyl acrylate esters such as cyclohexyl acrylate, norbornenyl acrylate or the like; aromatic vinyl monomers such as styrene, α-methylstyrene or the like; acrylamide; methacrylamide; acrylonitrile; methacrylonitrile; and the like. The amount of the additional polymerizable monomer is preferably not more than 10 parts by mass and more preferably not more than 5 parts by mass relative to 100 parts by mass of all the polymerizable monomers subjected to the polymerization.

The methyl methacrylate, the acrylic acid alkyl ester and the additional polymerizable monomer used in the present invention preferably contain a polymerization inhibitor for preventing polymerization from proceeding during storage in the presence of oxygen. The polymerization inhibitor is not particularly limited provided that it exhibits an effect of inhibiting polymerization from proceeding in the presence of oxygen, but preferably, the polymerization inhibitor does not inhibit polymerization reaction from proceeding in an inert gas atmosphere. Typical examples of the polymerization inhibitor include phenol polymerization inhibitors such as butylxylenol, p-methoxyphenol, hydroquinone or the like; phenothiazine; and the like. The content of the polymerization inhibitor is preferably from 0.1 ppm to 50 ppm and more preferably from 0.5 ppm to 30 ppm relative to the total amount of the polymerizable monomers comprised in the liquid starting material (A).

Examples of the chain transfer agent comprised in the liquid starting material (A) include alkylmercaptans such as n-octyl mercaptan, n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate or the like; an α-methylstyrene dimer; terpinolene; and the like. Among these, monofunctional alkylmercaptans such as n-octyl mercaptan and n-dodecyl mercaptan are preferable. The chain transfer agent can be used alone or as a combination of two or more of these. The amount of the chain transfer agent is preferably from 0.1 to 1 part by mass, more preferably from 0.2 to 0.8 part by mass, and further preferably from 0.3 to 0.6 part by mass relative to 100 parts by mass of all the polymerizable monomers subjected to the polymerization.

The concentration of dissolved oxygen in the liquid starting material (A) is not more than 50 ppm, preferably not more than 1 ppm. When the concentration of dissolved oxygen in the liquid starting material (A) is high, polymerization may not proceed steadily.

The liquid starting material (A) has a b* preferably of −1 to 2, more preferably −0.5 to 1.5. The b* within this range is advantageous because the resulting (meth)acrylic resin composition efficiently gives a formed article having little discoloration. The b* is a value measured in accordance with Commission internationale de l'éclairage (CIE) standard (1976) or JIS Z-8722.

The liquid starting material (A) is not particularly limited in the method of preparation thereof. The liquid starting material (A) can be obtained, for example, by mixing the methyl methacrylate, the acrylic acid alkyl ester and the chain transfer agent at a predetermined proportion and then bringing the resulting mixture into contact with an inert gas such as nitrogen gas or the like for removal of dissolved oxygen.

The methyl methacrylate, the acrylic acid alkyl ester and the chain transfer agent comprised in the liquid starting material (A) may comprise both of a virgin material (not yet undergone polymerization reaction) fed from a raw-material tank and unreacted matter that has been put for use in polymerization reaction but recovered as described above. The unreacted matter thus recovered may contain a dimer and a trimer in addition to the methyl methacrylate, the acrylic acid alkyl ester and the chain transfer agent, and may have a high b* due to heat applied during recovery or the like. In this case, the dimer and/or the trimer can be removed by the known purification method to give a b* preferably of −1 to 2, more preferably of −0.5 to 1.5. The b* within this range is advantageous because the resulting (meth)acrylic resin composition efficiently gives a formed article having little discoloration.

When bringing the liquid starting material (A) into contact with the inert gas, the ratio of the feeding amount of the liquid starting material (A) (kg/h) to the feeding amount of the inert gas ($Nm^3/h$) is preferably less than 0.30. With this ratio, the concentration of dissolved oxygen in the liquid starting material (A) can be efficiently reduced. For higher efficiency in terms of contact with the inert gas, bubbling of the inert gas in the liquid starting material (A) can be performed, for instance.

The liquid starting material (B) comprises a radical polymerization initiator, a polymerization inhibitor and methyl methacrylate.

The radical polymerization initiator comprised in the liquid starting material (B) is not particularly limited provided that it generates a reactive radical. However, the half life of the radical polymerization initiator at a temperature equal to the temperature inside the tank reactor described below is preferably from 0.5 to 120 seconds, and more preferably from 2 to 60 seconds. The polymerization initiator has a hydrogen abstraction capacity of preferably not more than 40%, and more preferably not more than 30%. The polymerization initiator can be used alone or as a combination of two or more of these.

Examples of the radical polymerization initiator include t-hexylperoxy isopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy) cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate), and the like. Among these, 2,2'-azobis(2-methylpropionitrile), t-hexylperoxy 2-ethylhexanoate, 1,1-bis(t-hexylperoxy) cyclohexane, and dimethyl 2,2'-azobis(2-methylpropionate) are preferable.

The hydrogen abstraction capacity can be found, for example, in the Technical data from the manufacturer of the polymerization initiator (for example, Non-patent Document 1), or can be determined by the radical trapping method using an α-methylstyrene dimer, in other words, by the α-methylstyrene dimer trapping method. The determination is generally carried out as follows. First, in the co-presence of an α-methylstyrene dimer serving as a radical-trapping agent, the polymerization initiator is cleaved into radical fragments. Among the resulting radical fragments, a radical fragment having a low hydrogen abstraction capacity adds to and is trapped by a double bond of an α-methylstyrene dimer, while a radical fragment having a high hydrogen abstraction capacity abstracts hydrogen from cyclohexane to generate a cyclohexyl radical, which adds to and is trapped by a double bond of an α-methylstyrene dimer to generate a cyclohexane-trapped product. Then, the cyclohexane or the cyclohexane-trapped product is quantitatively assessed, and the resulting value is used to determine the ratio (molar fraction) of the amount of radical fragments having a high hydrogen abstraction capacity to the theoretical amount of radical fragments generated. The resulting ratio serves as the hydrogen abstraction capacity.

The feeding amount of the radical polymerization initiator is considerably smaller than the feeding amount of the liquid starting material (A). Therefore, for smooth feeding of the radical polymerization initiator, the radical polymerization initiator is preferably dissolved in and diluted with the methyl methacrylate, for use as the liquid starting material (B).

The concentration of the radical polymerization initiator in the liquid starting material (B) is preferably not less than 0.01% by mass and less than 4% by mass, more preferably not less than 0.1% by mass and less than 2% by mass. When the concentration of the radical polymerization initiator is too low, the amount of the liquid starting material (B) required to be fed into a reaction tank is high, leading to potentially unsteady polymerization. When the concentration of the radical polymerization initiator is too high, storage stability of the liquid starting material (B) is low, and as a result, inconveniences are to likely to occur when operation resumes after a prolonged halt.

The polymerization inhibitor comprised in the liquid starting material (B) is not particularly limited provided that it exhibits an effect of inhibiting polymerization from proceeding in the presence of oxygen, but preferably, the polymerization inhibitor does not inhibit polymerization from proceeding in an inert gas atmosphere. Typical examples of the polymerization inhibitor include phenol polymerization inhibitors such as butylxylenol, p-methoxyphenol, hydroquinone or the like; phenothiazine, and the like. The content of the polymerization inhibitor is preferably from 0.1 ppm to 50 ppm and more preferably from 0.5 ppm to 30 ppm relative to the amount of the methyl methacrylate comprised in the liquid starting material (B).

The liquid starting material (B) has been maintained, in the presence of oxygen, at a temperature of not more than 10° C., preferably not more than 5° C., more preferably not more than 2° C., and further preferably not more than 0° C. Oxygen can be made present, for example, by blowing air into a tank in which the liquid starting material (B) is being prepared. When the temperature of the liquid starting material (B) is maintained at not more than 10° C., alteration in the quality of the liquid starting material (B) is inhibited. When the temperature of the liquid starting material (B) is more than 10° C., the radical polymerization initiator may be decomposed and cause generation of radicals, allowing polymerization reaction of the methyl methacrylate as a solvent to proceed.

Although no solvent is used in bulk polymerization in principle, when it is necessary to regulate viscosity, for example, a solvent can be comprised in the liquid starting material (A) or the liquid starting material (B). As the solvent, an aromatic hydrocarbon such as benzene, toluene, ethylbenzene or the like is preferable. The solvent can be used alone or as a combination of two or more of these. The amount of the solvent is preferably not more than 30 parts by mass and more preferably not more than 10 parts by mass relative to 100 parts by mass of all the polymerizable monomers subjected to the polymerization.

The tank reactor used in the method of the present invention usually has a reaction tank, a stirring means for stirring the liquid inside the reaction tank, an inlet through which a liquid starting material is fed into the reaction tank, and an outlet through which the reaction product is discharged from the reaction tank. In the tank reactor used in the present invention, the inlet through which a liquid starting material is fed into the reaction tank may be placed in the top surface of the reaction tank, or may be placed in the side surface of the reaction tank, or may be placed in the bottom surface of the reaction tank. The inlet may be placed higher than the liquid level in the reaction tank or may be placed lower than the liquid level in the reaction tank. The inlet may have the shape of the actual cut end of a round tube, or may have such a shape that a liquid starting material is widely sprinkled onto the liquid surface in the reaction tank.

The feeding method of the liquid starting material (A) and the liquid starting material (B) into the tank reactor is not particularly limited. For example, the liquid starting material (A) and the liquid starting material (B) may be respectively fed into a tank reactor that is equipped with at least two inlets through the each inlet, or the liquid starting material (A) and the liquid starting material (B) may be mixed within a pipe or a mixing tank immediately upstream of at least one inlet and then fed into a tank reactor that is equipped with the inlet through the inlet. A dynamic stirrer or a static stirrer can be placed where they are mixed.

The liquid starting material (A) and the liquid starting material (B) are fed into the tank reactor preferably at a mass ratio of the liquid starting material (A) to the liquid starting material (B) from 10/1 to 1000/1. When the amount of the liquid starting material (A) being fed is too high, the concentration of the radical polymerization initiator in the liquid starting material (B) needs to be high so that polymerization reaction can be initiated. As a result, storage stability of the liquid starting material (B) tends to be impaired. When the amount of the liquid starting material (A) being fed is too low, the concentration of dissolved oxygen within the tank in which polymerization reaction proceeds is high, leading to potentially unsteady polymerization.

In the present invention, the total amount of the liquid starting materials being fed into the reaction tank and the total amount of the reaction product being discharged from the reaction tank are kept in balance so that the amount of the liquid inside the reaction tank remains approximately constant. The amount of the liquid inside the reaction tank is preferably not less than ¼, more preferably from ¼ to ¾, and further preferably from ⅓ to ⅔ the capacity of the reaction tank. In the present invention, bulk polymerization reaction is preferably carried out in an inert gas atmosphere that is produced, for example, by introducing an inert gas into the gas phase in the reaction tank.

Examples of the stirring means include a Maxblend stirring device, a lattice-blade-type stirring device, a propeller-driven stirring device, a screw stirring device, a helical-ribbon-type stirring device, a paddle-type stirring device, and the like. Among these, a Maxblend stirring device is preferable in terms of homogeneous mixing.

The temperature inside the tank reactor, namely, the temperature of the liquid in the reaction tank, is preferably from 100 to 170° C., more preferably from 110 to 160° C., and further preferably from 115 to 150° C. The temperature can be controlled, for example, by external heat exchange using a jacket, a heat exchanger tube, or the like, or by self heat exchange in which a tube is provided within the reaction tank so that the liquid starting materials or the reaction product flows through the tube.

Bulk polymerization within the tank reactor is preferably allowed to proceed until the polymerization conversion ratio reaches 40 to 70% by mass, preferably 42 to 65% by mass.

In the method for producing a (meth)acrylic resin composition of the present invention, the water content of the reaction solution in the tank reactor is preferably not more than 1000 ppm, more preferably not more than 700 ppm, and further preferably not more than 280 ppm. When the water content is not more than 1000 ppm, a resin contaminant of several micrometers to several dozen micrometers can be inhibited from occurring during polymerization reaction, and consequently, when the resulting (meth)acrylic resin composition is subjected to melt forming, the resulting film or sheet can have a significantly reduced number of blemishes attributable to the resin contaminant that serves as a nucleus and has an outer diameter of several dozen micrometers.

Although the mechanism that the occurring of the resin contaminant is thus inhibited is not clear, it is presumed that a (meth)acrylic resin having a high molecular weight may be formed in the gas phase within the reaction tank, get mixed as a resin contaminant, remain unmelted during melt forming, and act as a nucleus to form a blemish.

Examples of the method for reducing the water content of the reaction mixture include a method comprising treating the liquid starting materials with an adsorption/dehydration column or the like before being fed into the tank reactor, a method comprising introducing an inert gas into the gas phase within the tank reactor so that part of the vapor is entrained in the inert gas, condensed in a condenser of a brine cooler, and discharged out of the system.

Downstream of the tank reactor, additional reactor may be provided. The additional reactor that may be provided downstream may be a tank reactor or a tube reactor. The downstream reactor can allow bulk polymerization to further proceed and can give an even higher polymerization conversion ratio.

The reaction product thus obtained by bulk polymerization is discharged from the tank reactor (or from the reactor provided downstream, if any). The amount of the reaction product being discharged is preferably balanced with the amount of the liquid starting materials being fed so that the amount of the liquid in the reaction tank remains constant.

The reaction product comprises a (meth)acrylic resin, an unreacted polymerizable monomer (including methyl methacrylate, acrylic acid ester, and the like), and an unreacted chain transfer agent.

The content of the (meth)acrylic resin in the reaction product is preferably from 40 to 70% by mass, more preferably from 42 to 65% by mass. When the content of the (meth)acrylic resin is too high, viscosity rises and stirring force required tends to be great. When the content of the (meth)acrylic resin is too low, removal of the unreacted matter in the step of removing the unreacted matter from the reaction product proceeds insufficiently, and the resulting (meth)acrylic resin composition tends to give a formed article having defective appearance such as silver streak.

The (meth)acrylic resin has a weight average molecular weight (hereinafter, sometimes abbreviated as Mw) from preferably 35 thousand to 200 thousand, more preferably from 40 thousand to 150 thousand, and further preferably from 45 thousand to 130 thousand. When the Mw is too low, a formed article comprising the (meth)acrylic resin composition tends to have poor impact resistance and poor toughness. When the Mw is too high, the fluidity of the (meth)acrylic resin composition tends to be low and forming processability tends to be low.

The (meth)acrylic resin has a ratio of weight average molecular weight/number average molecular weight (hereinafter, this ratio is sometimes expressed as the molecular weight distribution) preferably from 1.5 to 2.6, more preferably from 1.6 to 2.3, and particularly preferably from 1.7 to 2.0. When the molecular weight distribution is low, forming processability of the (meth)acrylic resin composition tends to be poor. When the molecular weight distribution is high, a formed article comprising the (meth)acrylic resin composition tends to have poor impact resistance and be brittle.

The weight average molecular weight and the number average molecular weight are the molecular weights in terms of standard polystyrene determined by GPC (gel permeation chromatography). The weight average molecular weight and the molecular weight distribution of the (meth)acrylic resin can be modulated by selecting, for example, the types and the amounts of the polymerization initiator and the chain transfer agent.

The unreacted matter comprised in the reaction product can be recovered by a known chemical engineering means. As the recovering method, for example, mentioned are a heat devolatization method, and the like. Examples of the heat devolatization method include the equilibrium flash evaporation method, the adiabatic flash evaporation method, and the like. The adiabatic flash evaporation method is preferable. The adiabatic flash evaporation method is carried out at a temperature preferably from 200 to 300° C., more preferably from 220 to 270° C. When the adiabatic flash evaporation method is carried out at a temperature of lower than 200° C., devolatization takes time, devolatization may proceed insufficiently, and a formed article may have defective appearance such as silver streak. On the other hand, when the adiabatic flash evaporation method is carried out at a temperature higher than 300° C., oxidation, burning and the like tend to occur and discoloration of the (meth)acrylic resin composition tends to occur. The adiabatic flash evaporation method may be carried out in multiple stages.

Vapor of the unreacted matter generated by flash evaporation can be used to heat the reaction product flowing through the heat exchanger tube, followed by feeding the heated reaction product into a flash tank at low pressure to cause flash evaporation. The reaction product can be pressurized using a pump, for example.

The unreacted matter immediately after recovered by the pressurization/devolatization method contains methyl methacrylate, an acrylic acid alkyl ester, and a chain transfer agent, as well as a dimer or a trimer. The dimer or the trimer may affect the properties of the (meth)acrylic resin and is therefore preferably removed from the unreacted matter. At the time of removal of the dimer or the trimer, part of the chain transfer agent and solvent may also be removed.

Removal of the dimer or the trimer can be performed by a known chemical engineering means. Preferable examples thereof include a method comprising distillation, and the like. A distillation column used in the present invention is not particularly limited but is preferably a multi-stage distillation column having about 6 to about 20 stages and a reflux ratio from about 0.4 to about 2.0.

After the unreacted matter is recovered from the reaction product, the (meth)acrylic resin composition according to the present invention is obtained. The resulting (meth) acrylic resin composition can be made into a pellet form or a powder and grain form by a known method, for ease of handling of the (meth)acrylic resin composition as a forming material. The amount of the polymerizable monomer remaining in the (meth)acrylic resin composition obtained in the present invention is preferably not more than 1% by mass, more preferably not more than 0.5% by mass.

To the (meth)acrylic resin composition obtained by the method of the present invention, various additives can be added if needed. The amounts of the additives are preferably not more than 0.5% by mass and more preferably not more than 0.2% by mass relative to the amount of the (meth) acrylic resin composition. When the amounts of the additives are too high, a formed article may have defective appearance such as silver streak.

Examples of the additives include an antioxidant, a thermal degradation inhibitor, an ultraviolet absorber, a light stabilizer, a lubricant, a mold release agent, a polymer processing aid, an antistatic agent, a flame retardant, a dye and a pigment, a light dispersing agent, an organic coloring agent, a delustering agent, an impact resistance modifier, a fluorescent substance, and the like.

The antioxidant, by itself, has an effect to prevent oxidative degradation of a resin from occurring in the presence of oxygen. Examples of the antioxidant include phosphorus antioxidants, hindered phenol antioxidants, thioether antioxidants, and the like. The antioxidant can be used alone or as a combination of two or more of these. Among these, from the viewpoint of the effect to prevent optical properties from being impaired due to discoloration, phosphorus antioxidants and hindered phenol antioxidants are preferable, and a combined use of a phosphorus antioxidant and a hindered phenol antioxidant is more preferable.

When a phosphorus antioxidant and a hindered phenol antioxidant are used in combination, the proportion therebetween is not particularly limited but is preferably from 1/5 to 2/1 and more preferably from 1/2 to 1/1 in terms of the mass ratio of the phosphorus antioxidant to the hindered phenol antioxidant.

As the phosphorus antioxidant, 2,2-methylenebis(4,6-di-t-butylphenyl)octyl phosphite (manufactured by ADEKA CORPORATION, trade name: ADK STAB HP-10), tris(2, 4-di-t-butylphenyl)phosphite (manufactured by Ciba Specialty Chemicals, trade name: IRUGAFOS 168), and 3,9-bis(2,6-di-t-butyl-4-methylphenoxy)-2,4,8,10-tetraoxa-3,9-diphosphaspiro [5.5] undecane (manufactured by ADEKA CORPORATION, trade name: ADK STAB PEP-36) are preferable, for example.

As the hindered phenol antioxidant, pentaerythrityl-tetrakis[3-(3,5-di-t-butyl-4-hydroxy phenyl)propionate] (manufactured by Ciba Specialty Chemicals, trade name: IRGANOX 1010) and octadecyl-3-(3,5-di-t-butyl-4-hydroxyphenyl)propionate (manufactured by Ciba Specialty Chemicals, trade name: IRGANOX 1076) are preferable, for example.

The thermal degradation inhibitor can trap a polymer radical that is generated at high heat in the practical absence of oxygen, and as a result, can prevent thermal degradation of the resin.

As the thermal degradation inhibitor, 2-t-butyl-6-(3'-t-butyl-5'-methyl-hydroxybenzyl)-4-m ethylphenyl acrylate (manufactured by Sumitomo Chemical Company, Limited, trade name: SUMILIZER GM) and 2,4-di-t-amyl-6-(3',5'-di-t-amyl-2'-hydroxy-α-methyl benzyl)phenyl acrylate (manufactured by Sumitomo Chemical Company, Limited, trade name: SUMILIZER GS) are preferable, for example.

The ultraviolet absorber is a compound capable of absorbing ultraviolet light. The ultraviolet absorber is a compound known to have a primary function of converting light energy into thermal energy.

Examples of the ultraviolet absorber include benzophenones, benzotriazoles, triazines, benzoates, salicylates, cyanoacrylates, oxalic anilides, malonic acid esters, formamidines, and the like. The ultraviolet absorber can be used alone or as a combination of two or more of these.

Preferable among these are benzotriazoles, or ultraviolet absorbers having a maximum molar absorption coefficient, $\epsilon_{max}$, at a wavelength from 380 to 450 nm of not more than 1200 dm$^3$·mol$^{-1}$cm$^{-1}$.

Benzotriazoles effectively inhibit optical properties from being impaired due to, for example, discoloration caused by ultraviolet exposure, and are therefore preferably used as an ultraviolet absorber when the (meth)acrylic resin composition is used in applications where such a property is required.

As the benzotriazoles, 2-(2H-benzotriazol-2-yl)-4-(1,1,3, 3-tetramethylbutyl)phenol (manufactured by Ciba Specialty Chemicals, trade name: TINUVIN 329), 2-(2H-benzotriazol-2-yl)-4,6-bis(1-methyl-1-phenylethyl)phenol (manufactured by Ciba Specialty Chemicals, trade name: TINUVIN 234), 2,2'-methylenebis[4-t-octyl-6-(2H-benzotriazol- 2-yl) phenol] (manufactured by ADEKA CORPORATION, LA-31), and 2-(5-octylthio-2H-benzotriazol-2-yl)-6-tert-butyl-4-methylphenol are preferable, for example.

The ultraviolet absorbers having a maximum molar absorption coefficient, $\epsilon_{max}$, at a wavelength from 380 to 450 nm of not more than 1200 $dm^3 \cdot mol^{-1} cm^{-1}$ can inhibit yellowing of the resulting formed article.

The maximum molar absorption coefficient, $\epsilon_{max}$, of the ultraviolet absorber is measured as follows. To 1 L of cyclohexane, 10.00 mg of the ultraviolet absorber is added and dissolved until no undissolved matter is visually observed. The resulting solution is poured into a quartz glass cell of 1 cm×1 cm×3 cm and the absorbance at a wavelength from 380 to 450 nm is measured using a U-3410 spectrophotometer manufactured by Hitachi, Ltd. Using the molecular weight (Mw) of the ultraviolet absorber and the maximum absorbance ($A_{max}$) thus measured, the maximum molar absorption coefficient, $\epsilon_{max}$, is calculated by formula:

$$\epsilon_{max} = [A_{max}/(10 \times 10^{-3})] \times Mw.$$

Examples of the ultraviolet absorbers having a maximum molar absorption coefficient, $\epsilon_{max}$, at a wavelength from 380 to 450 nm of not more than 1200 $dm^3 \cdot mol^{-1} cm^{-1}$ include 2-ethyl-2'-ethoxy-oxalic anilide (manufactured by Clariant (Japan) K.K., trade name: Sanduvor VSU) and the like.

Among these ultraviolet absorbers, from the viewpoint that degradation of the resin caused by ultraviolet exposure is inhibited, benzotriazoles are preferably used.

The light stabilizer is a compound that is known to have a primary function of trapping a radical generated by light oxidation. Preferable examples of the light stabilizer include hindered amines such as compounds having a 2,2,6,6-tetraalkylpiperidine skeleton, and the like.

The mold release agent is a compound that has a function of facilitating release of a formed article from a mold. Examples of the mold release agent include higher alcohols such as cetyl alcohol, stearyl alcohol and the like; glycerol higher fatty acid esters such as stearic acid monoglyceride, stearic acid diglyceride; and the like. As the mold release agent in the present invention, a higher alcohol and a glycerol fatty acid monoester are preferably used in combination. When a higher alcohol and a glycerol fatty acid monoester are used in combination, the proportion therebetween is not particularly limited but is preferably from 2.5/1 to 3.5/1 and more preferably from 2.8/1 to 3.2/1 in terms of the mass ratio of the higher alcohol to the glycerol fatty acid monoester.

The polymer processing aid is a compound that, at the time when the (meth)acrylic resin composition is subjected to forming, effectively gives a thin film having an accurate thickness. The polymer processing aid is usually a polymer particle with a particle diameter from 0.05 to 0.5 μm that can be produced by the emulsion polymerization method.

The polymer particle may be a monolayer particle of a polymer having a single composition ratio and a single limiting viscosity, or may be a multilayer particle of two or more polymers having different composition ratios or different limiting viscosities. Among these, preferable examples thereof include, for example, particles having a two-layer structure where the inner layer is a polymer layer with a relatively low limiting viscosity and the outer layer is a polymer layer with a relatively high limiting viscosity of not less than 5 dl/g.

The polymer processing aid preferably has a limiting viscosity of 3 to 6 dl/g.

When the limiting viscosity is too low, the effect to improve formability is low. When the limiting viscosity is too high, the melt fluidity of the (meth)acrylic resin composition tends to be low.

To the (meth)acrylic resin composition, an impact resistance modifier may be added. Examples of the impact resistance modifier include core-shell type modifiers comprising acrylic rubber or diene rubber as a core layer component; modifiers comprising a plurality of rubber particles, and the like.

Preferable as the organic coloring agent is a compound that has a function of converting ultraviolet light, which is thought to be harmful to a resin, into visible light.

Examples of the light dispersing agent or the delustering agent include glass microparticles, polysiloxane crosslinked microparticles, crosslinked polymer microparticles, talc, calcium carbonate, barium sulfate, and the like.

Examples of the fluorescent substance include fluorescent pigments, fluorescent dyes, fluorescent white dyes, fluorescent brighteners, fluorescent bleaching agents, and the like.

These additives may be added during a phase in which the reaction starting materials are present, may be added during a phase in which the reaction product is present, or may be added during a phase in which the (meth)acrylic resin composition obtained after devolatization is present.

By subjecting the (meth)acrylic resin composition obtained by the method of the present invention to forming (through heating and melting) by a conventionally-known formation method such as injection molding, compression molding, extrusion, and vacuum forming, various formed articles can be obtained. Examples of the formed articles formed from the (meth)acrylic resin composition include parts of advertising signs such as advertising pillars, sign stands, projecting signs, door-top signs, and roof-top signs; display parts such as showcases, dividers, and store display parts; lighting fixture parts such as fluorescent lamp covers, mood lighting covers, lampshades, and parts of luminous ceilings, luminous walls, and chandeliers; parts of interior furnishings such as pendants and mirrors; building parts such as doors, domes, safety window panes, partitions, stair skirting boards, balcony skirting boards, and roofs of buildings for recreational use; carrier-related parts such as aircraft windshields, pilot visors, motorcycle windshields, motorboat windshields, visors for buses, side visors for automobiles, rear visors, head wings, and headlight covers; electronics parts such as nameplates for audiovisuals, stereo covers, television protection masks, and parts of vending machines; parts of medical equipment such as incubators and X-ray machines; parts related to instruments, such as machinery covers, gauge covers, parts of experiment instruments, rulers, dials, and view windows; optics-related parts such as protective plates for liquid crystal, light guide plates, light guide films, Fresnel lenses, lenticular lenses, and front plates and light dispersing plates of various displays; traffic-related parts such as traffic signs, direction boards, traffic mirrors, and noise barrier walls; film parts such as protective films for polarizers, protective films for polarizer plates, retardation films, surface materials for automotive interior, surface materials of mobile phones, and marking films; appliance parts such as lid materials and control panels of washers and top panels of rice cookers; other items such as greenhouses, large aquariums and water tanks, box-shaped aquariums and water tanks, clock panels, bathtubs, sanitary wares, desk mats, gaming parts, toys, and welding masks for facial protection; and the like.

EXAMPLES

The present invention is described more specifically by Examples and Comparative Examples. The present invention is, however, not limited to these Examples. The present invention includes all the embodiments that combine, appropriately, the above-mentioned requirements on technical characteristics such as properties, configurations, processes, and applications.

Measurement and the like of physical properties in the Examples and the Comparative Examples are carried out by the following methods.

(Polymerization Conversion Ratio)

To a gas chromatograph (manufactured by Shimadzu Corporation, GC-14A), a column (GLC-G-230 manufactured by Sciences Inc., INERT CAP 1 (df=0.4 µm, I.D.=0.25 mm, length=60 m)) was attached. Analysis was performed under conditions where the injection temperature was 180° C., the detector temperature was 180° C., and the column temperature was raised from 60° C. to reach 200° C. at a temperature raising rate of 10° C./min.

(Steadiness of Polymerization)

The polymerization conversion ratio was measured during continuous operation. Feeding of liquid starting materials into a tank reactor and discharging of a reaction product from the tank reactor were halted. Then, 5 hours after the halt of operation, the polymerization conversion ratio was measured.

If the difference between the polymerization conversion ratio measured during continuous operation and the polymerization conversion ratio measured 5 hours after the halt of operation was not less than 5%, evaluation was made as Poor (x). If the difference between the polymerization conversion ratio measured during continuous operation and the polymerization conversion ratio measured 5 hours after the halt of operation was less than 5%, evaluation was made as Excellent (○).

(Storage Stability of Liquid Starting Material (B))

A liquid starting material (B) after preparation was stored for 1 day in a tank in which the liquid starting material (B) was prepared. Then, a sample was taken from the liquid starting material (B), added to methanol, and observed for the state of the liquid.

If white turbidity was visually observed, indicating that polymerization reaction had proceeded, evaluation was made as Poor (x). If no white turbidity was visually observed, indicating that no polymerization reaction had practically proceeded, evaluation was made as Excellent (○).

Example 1

In an autoclave equipped with a stirrer and a sampling tube, 98.9 parts by mass of purified methyl methacrylate (MMA), 1.1 parts by mass of methyl acrylate (MA), and 0.257 part by mass of n-octyl mercaptan (OM) as a chain transfer agent were placed and mixed to obtain liquid starting material (A). Into the liquid starting material (A), nitrogen gas was blown so that the proportion of the amount of the liquid starting material (A) (kg/h) to the amount of nitrogen gas ($Nm^3/h$) was 0.2. The concentration of dissolved oxygen in the liquid starting material (A) was regulated to be 0.3 ppm.

In methyl methacrylate (MMA), 2,2'-azobis(2-methylpropionitrile) (polymerization initiator, AIBN) and butylxylenol (polymerization inhibitor) were dissolved so as to achieve 1.0% by mass of 2,2'-azobis(2-methylpropionitrile) and 1 ppm of butylxylenol. The temperature of the liquid was made to be 0° C. in an atmosphere replaced with industrial air to obtain a liquid starting material (B).

The interior of a continuous-flow tank reactor (capacity: 0.1 $m^3$, tank diameter: 500 mm, Maxblendblade, blade diameter: 260 mm, rotative speed: 200 rpm) equipped with a brine-cooling condenser was replaced with nitrogen gas.

The liquid starting material (A) and the liquid starting material (B) were mixed so that the concentration of the polymerization initiator was 74 ppm, whereby a reaction solution was obtained. The resulting reaction solution was continuously fed into the tank reactor at a constant flow rate so as to achieve a mean residence time of 120 minutes, with the temperature of the reaction solution being controlled to be 140° C. and the pressure within the tank reactor being controlled to be 0.3 MPa, allowing bulk polymerization to proceed. Simultaneously with this, a reaction product was continuously discharged from the tank reactor. Here, control of the pressure within the tank reactor was performed with a pressure control valve connected to the brine-cooling condenser. Evaluation of steadiness of polymerization and storage stability of the liquid starting material (B) was performed. The results are shown in Table 1.

Examples 2-3 and Comparative Examples 1-3

Continuous bulk polymerization reaction was carried out in the same manner as in Example 1 except that the recipe was changed to the recipes shown in Table 1. Evaluation of steadiness of polymerization and storage stability of the liquid starting material (B) was performed, and the results are shown in Table 1.

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Methyl methacrylate(MMA) [part by mass] | 98.9 | 94.0 | 100.0 | 91.8 | 94.0 | 94.0 |
| Methyl acrylate(MA) [part by mass] | 1.1 | 6.0 | 0.0 | 8.2 | 6.0 | 6.0 |
| n-Octyl mercaptan(OM) [part by mass] | 0.257 | 0.345 | 0.280 | 0.160 | 0.345 | 0.345 |
| Polymerization initiator(AIBN) [ppm] | 74 | 74 | 74 | 32 | 74 | 74 |
| Mean polymerization conversion ratio during continuous operation [%] | 52 | 57 | 52 | 45 | 57 | 57 |
| Mean residence time [hr] | 2.0 | 2.0 | 2.0 | 3.0 | 2.0 | 2.0 |
| Polymer MFR [g/10 min] | 2.4 | 10 | 2.6 | 1.3 | 10 | 10 |
| Concentration of dissolved oxygen in liquid starting material(A) [ppm] | 0.3 | 0.5 | 0.3 | 64 | 0.3 | 0.3 |
| Amount of liquid starting material(A)/amount of inert gas | 0.2 | 0.25 | 0.2 | 0.4 | 0.2 | 0.2 |
| Concentration of initiator in liquid starting material(B) [%] | 1.0 | 0.5 | 1.0 | 0.5 | 1.0 | 4.0 |
| Temperature during storage of liquid starting material(B) [° C.] | 0 | 0 | 0 | 0 | 0 | 20 |

TABLE 1-continued

|  | Ex. 1 | Ex. 2 | Ex. 3 | Comp. Ex. 1 | Comp. Ex. 2 | Comp. Ex. 3 |
|---|---|---|---|---|---|---|
| Atmosphere for storage of liquid starting material(B) | AIR | AIR | AIR | AIR | N2 | AIR |
| Steadiness of polymerization | ○ | ○ | ○ | x | ○ | x |
| Stability of liquid mixture(B) | ○ | ○ | ○ | ○ | x | x |

The results have shown that the method according to the present invention (Examples), during a temporary halt to operation in the continuous bulk polymerization mode, allows no significant change to occur in the polymerization conversion ratio of a reaction product solution within a reaction tank and allows a liquid starting material (B) to be maintained stable, and as a result, when the operation resumes, the state before the halt can be reconstituted immediately after the operation resumes.

The invention claimed is:

1. A method for producing a (meth)acrylic resin composition, the method comprising:
    preparing a liquid starting material (A) which comprises methyl methacrylate, an acrylic acid alkyl ester and a chain transfer agent, has a mass ratio of the acrylic acid alkyl ester to the methyl methacrylate of 0/100 to 20/80, and has a dissolved oxygen concentration of not more than 50 ppm;
    preparing a liquid starting material (B) which comprises a radical polymerization initiator, a polymerization inhibitor and methyl methacrylate, and has been maintained at a temperature of not more than 10° C. in the presence of oxygen, wherein the radical polymerization initiator has a half-life period of 0.5 to 120 seconds at a temperature inside a tank reactor during bulk polymerization;
    continuously feeding the liquid starting material (A) and the liquid starting material (B) into the tank reactor;
    allowing the bulk polymerization to proceed in the tank reactor at a polymerization conversion ratio of 40 to 70% by mass to give a reaction product; and
    continuously discharging the reaction product from the tank reactor.

2. The method according to claim 1, wherein the liquid starting material (A) has the dissolved oxygen concentration of not more than 1 ppm.

3. The method according to claim 1, wherein a concentration of the radical polymerization initiator in the liquid starting material (B) is not less than 0.01% by mass and less than 4% by mass.

4. The method according to claim 1, wherein the dissolved oxygen concentration in the liquid starting material (A) is controlled by a method comprising mixing the liquid starting material (A) and an inert gas so that a ratio of a feeding amount of the liquid starting material (A) [kg/h] to a feeding amount of the inert gas [Nm$^3$/h] is less than 0.30.

5. The method according to claim 1, further comprising removing unreacted matter from the reaction product.

6. The method according to claim 1, wherein the preparing of the liquid starting material (A) comprises mixing the methyl methacrylate, the acrylic acid alkyl ester and the chain transfer agent.

7. The method according to claim 5, wherein the preparing of the liquid starting material (A) comprises mixing the methyl methacrylate, the acrylic acid alkyl ester, the chain transfer agent and the unreacted matter removed from the reaction product.

8. The method according to claim 1, wherein the preparing of the liquid starting material (B) comprises dissolving the radical polymerization initiator and the polymerization inhibitor in the methyl methacrylate.

9. The method according to claim 1, wherein a content of the polymerization inhibitor in the liquid starting material (B) is 0.1 ppm to 50 ppm relative to an amount of the methyl methacrylate in the liquid starting material (B).

10. The method according to claim 1, wherein the polymerization inhibitor is capable of exhibiting an effect of inhibiting polymerization in the presence of oxygen.

11. The method according to claim 10, wherein the polymerization inhibitor is at least one selected from the group consisting of a phenol polymerization inhibitor and phenothiazine.

12. A method for temporary halt of continuous polymerization process of a (meth)acrylic resin composition, wherein the continuous polymerization process comprises:
    preparing a liquid starting material (A) which comprises methyl methacrylate, an acrylic acid alkyl ester and a chain transfer agent, has a mass ratio of the acrylic acid alkyl ester to the methyl methacrylate of 0/100 to 20/80, and has a dissolved oxygen concentration of not more than 50 ppm;
    preparing a liquid starting material (B) which comprises a radical polymerization initiator, a polymerization inhibitor and methyl methacrylate, wherein the radical polymerization initiator has a half-life period of 0.5 to 120 seconds at a temperature inside a tank reactor; continuously feeding the liquid starting material (A) and the liquid starting material (B) into the tank reactor, allowing bulk polymerization to proceed in the tank reactor at a polymerization conversion ratio of 40 to 70% by mass to give a reaction product; and continuously discharging the reaction product from the tank reactor,
    the method comprising:
    pausing the continuously feeding of the liquid starting materials (A) and (B) into the tank reactor and the continuously discharging of the reaction product from the tank reactor; and
    storing the liquid starting material (B) while being maintained at a temperature of not more than 10° C. in the presence of oxygen during the pausing.

* * * * *